(12) United States Patent
Jairazbhoy et al.

(10) Patent No.: US 12,479,267 B2
(45) Date of Patent: Nov. 25, 2025

(54) METHOD OF DEVELOPING A CONTROL STRATEGY FOR A VEHICLE THERMAL MANAGEMENT SYSTEM, AND VEHICLE THERMAL MANAGEMENT SYSTEM

(71) Applicant: FCA US LLC, Auburn Hills, MI (US)

(72) Inventors: Vivek Jairazbhoy, Farmington Hills, MI (US); Drushan Mavalankar, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 302 days.

(21) Appl. No.: 18/308,141

(22) Filed: Apr. 27, 2023

(65) Prior Publication Data
US 2024/0359531 A1 Oct. 31, 2024

(51) Int. Cl.
*B60H 1/00* (2006.01)

(52) U.S. Cl.
CPC ..... *B60H 1/00807* (2013.01); *B60H 1/00278* (2013.01)

(58) Field of Classification Search
CPC ............. B60H 1/00807; B60H 1/00278
USPC ............................................. 165/202
See application file for complete search history.

(56) References Cited

U.S. PATENT DOCUMENTS

2012/0327596 A1 * 12/2012 Anderson-Straley ....................... H01M 10/625
361/689
2013/0269911 A1 * 10/2013 Carpenter ............ B60H 1/004
165/104.19

FOREIGN PATENT DOCUMENTS

WO    WO2012040022 A2 *  3/2012   ......... B60H 1/00278

* cited by examiner

*Primary Examiner* — Davis D Hwu
(74) *Attorney, Agent, or Firm* — Jeremy J. Klobucar

(57) ABSTRACT

A method of developing a control strategy for a thermal management system. The method includes decomposing a thermal management circuit defined by a plurality of secondary circuits that are each in fluid communication with each other into a plurality of sub-loops, the fluid communication between each of the secondary circuits and thermal management of the thermal management circuit being controlled by a plurality of actuators; determining at least one global thermal function associated with the thermal management circuit; after determining the at least one global thermal function associated with the thermal management circuit, determining an actuator mode capable of achieving the at least one global thermal function wherein the actuator mode is a collection of states of each of the plurality of actuators in the thermal management circuit; and forming at least one control algorithm for the thermal management circuit based on the actuator mode.

17 Claims, 4 Drawing Sheets

1. Battery Heating - Cabin Heating - LTL Conditioning
2. Battery Heating - Cabin Heating - LTL Cooling
3. Battery Heating - Cabin Off - LTL Conditioning
4. Battery Heating - Cabin Off - LTL Cooling
5. Battery Cooling - Cabin Heating - LTL Conditioning
6. Battery Cooling - Cabin Heating - LTL Cooling
7. Battery Cooling - Cabin Off - LTL Conditioning
8. Battery Cooling - Cabin Off - LTL Cooling
9. Battery Off - Cabin Heating - LTL Conditioning
10. Battery Off - Cabin Heating - LTL Cooling
11. Battery Off - Cabin Off - LTL Conditioning
12. Battery Off - Cabin Off - LTL Cooling

FIG. 3

| MODE | ECH 30 | ECH 66 | CHILLER 68 | VALVE 38 | VALVE 70 | VALVE 60 | PUMP 64 | PUMP 46 | PUMP 28 |
|---|---|---|---|---|---|---|---|---|---|
| 1 | 0 | 0 | 0 | 0 | 0 | 1 | 1 | 1 | 1 |
| 2 | 0 | 0 | 0 | 0 | 1 | 1 | 1 | 1 | 1 |
| 3 | 0 | 1 | 0 | 0 | 0 | 1 | 1 | 1 | 1 |
| 4 | 1 | 0 | 0 | 0 | 0 | 0 | 1 | 1 | 1 |
| 5 | 1 | 0 | 0 | 0 | 1 | 1 | 1 | 1 | 1 |
| 6 | 1 | 0 | 0 | 0 | 1 | 0 | 1 | 1 | 1 |
| 7 | 1 | 1 | 0 | 0 | 0 | 1 | 1 | 1 | 1 |
| 8 | 1 | 1 | 0 | 0 | 0 | 0 | 1 | 1 | 1 |
| 9 | 1 | 1 | 0 | 0 | 1 | 1 | 1 | 1 | 1 |
| 10 | 1 | 1 | 0 | 0 | 0 | 0 | 1 | 1 | 1 |
| 11 | 1 | 1 | 0 | 0 | 0 | 1 | 1 | 1 | 1 |
| 12 | 1 | 1 | 0 | 0 | 1 | 1 | 1 | 1 | 1 |

FIG. 4

METHOD OF DEVELOPING A CONTROL STRATEGY FOR A VEHICLE THERMAL MANAGEMENT SYSTEM, AND VEHICLE THERMAL MANAGEMENT SYSTEM

FIELD

The present disclosure relates to a method of developing a control strategy for a vehicle thermal management system, and a vehicle thermal management system.

BACKGROUND

This section provides background information related to the present disclosure which is not necessarily prior art.

Vehicles with electric propulsion n systems are becoming increasingly more common, and these types of vehicles include thermal management system(s) (TMS). The TMS of the vehicle is used to heat/cool various features of the vehicle including, for example and without limitation, a cabin of the vehicle, an electric drive motor/inverter assembly of the vehicle, and a battery that is used to power the electric drive motor. The TMS may include various actuators (e.g., valves, pumps, etc.) that control the amount of heating/cooling provided to the features. As the TMS increases in complexity, the number of various combinations of actuator states also increases simultaneously. Indeed, it is not uncommon to have 150 or more useful "actuator modes" (where an "actuator mode" is a collection of states of all the actuators in the TMS) in a complex TMS. Thus, it can be very difficult and/or time consuming to develop control algorithms directed to each mode.

SUMMARY

This section provides a general summary of the disclosure, and is not a comprehensive disclosure of its full scope or all of its features.

According to a first aspect of the present disclosure, there is provided a method of developing a control strategy for a thermal management system. The method includes decomposing a thermal management circuit defined by a plurality of secondary circuits that are each in fluid communication with each other into a plurality of sub-loops, the fluid communication between each of the secondary circuits and thermal management of the thermal management circuit being controlled by a plurality of actuators; determining at least one global thermal function associated with the thermal management circuit; after determining the at least one global thermal function associated with the thermal management circuit, determining an actuator mode capable of achieving the at least one global thermal function wherein the actuator mode is a collection of states of each of the plurality of actuators in the thermal management circuit; and forming at least one control algorithm for the thermal management circuit based on the actuator mode.

According to the first aspect, the at least one global thermal function includes a combination of sub-functions.

According to the first aspect, after the thermal management circuit has been decomposed into the plurality of sub-loops, the method further comprises determining properties of each of the sub-loops.

According to the first aspect, the determining properties of each of the sub-loops includes determining at least one selected from the group consisting of a flow domain defined by each of the sub-loops; a flow path of each of the sub-loops; a number of sub-functions to be performed by each of the sub-loops; the actuators contained in the sub-loop; and performance models and/or simulations of the sub-loop.

According to the first aspect, the determining properties of each of the sub-loops includes determining whether there is a thermal interface between the sub-loops.

According to the first aspect, the determining performance models and/or simulations of the sub-loop includes collecting experimental or simulation data sub-loop by sub-loop to calibrate real-time modes of each of the sub-loops that are used in the control algorithm.

According to the first aspect, the determining performance models and/or simulations of the sub-loop includes collecting experimental or simulation data sub-loop by sub-loop to validate performance of the control algorithm.

According to the first aspect, after properties of each of the sub-loops has been determined, the method further comprises assigning an identifier for each sub-loop.

According to the first aspect, the determining an actuator mode capable of achieving the at least one global thermal function includes determining a plurality of actuator modes capable of achieving the at least one global thermal function.

According to the first aspect, after determining the plurality of actuator modes capable of achieving the at least one global thermal function, the method further comprises selecting at least one of the actuator modes from the plurality for a desired system state and target.

According to the first aspect, the plurality of actuators include valves, pumps, coolant heaters, and coolant chillers.

According to the first aspect, the thermal management circuit includes components or sub-systems to be thermally managed including a cabin of a vehicle, an electric drive module, and a battery assembly.

According to the first aspect, a respective sub-loop is defined by at least one of the secondary circuits.

According to the first aspect, a respective sub-loop is defined by a combination of at least portions of the secondary circuits.

According to the first aspect, the control algorithm provides at least one of optimal control, feedback control, feedforward control, and a combination of feedback/feedforward control of the thermal management circuit.

According to a second aspect of the present disclosure, there is provided a thermal management system developed according to the method used in the first aspect.

According to the second aspect, the thermal management system includes a controller that is configured to store and execute the control algorithm.

According to the second aspect, the thermal management system also includes a plurality of sensors in communication with the controller, and based on signals received from the plurality of sensors, the controller is configured to execute at least one of feedback control, feedforward control, and a combination of feedback/feedforward control of the thermal management circuit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is listing of various global thermal functions of the TMS shown in FIG. 1; and FIG. 4 is a spreadsheet illustrating the modes of various actuators of the TMS that are capable of achieving one of the global thermal functions listed in FIG. 3.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
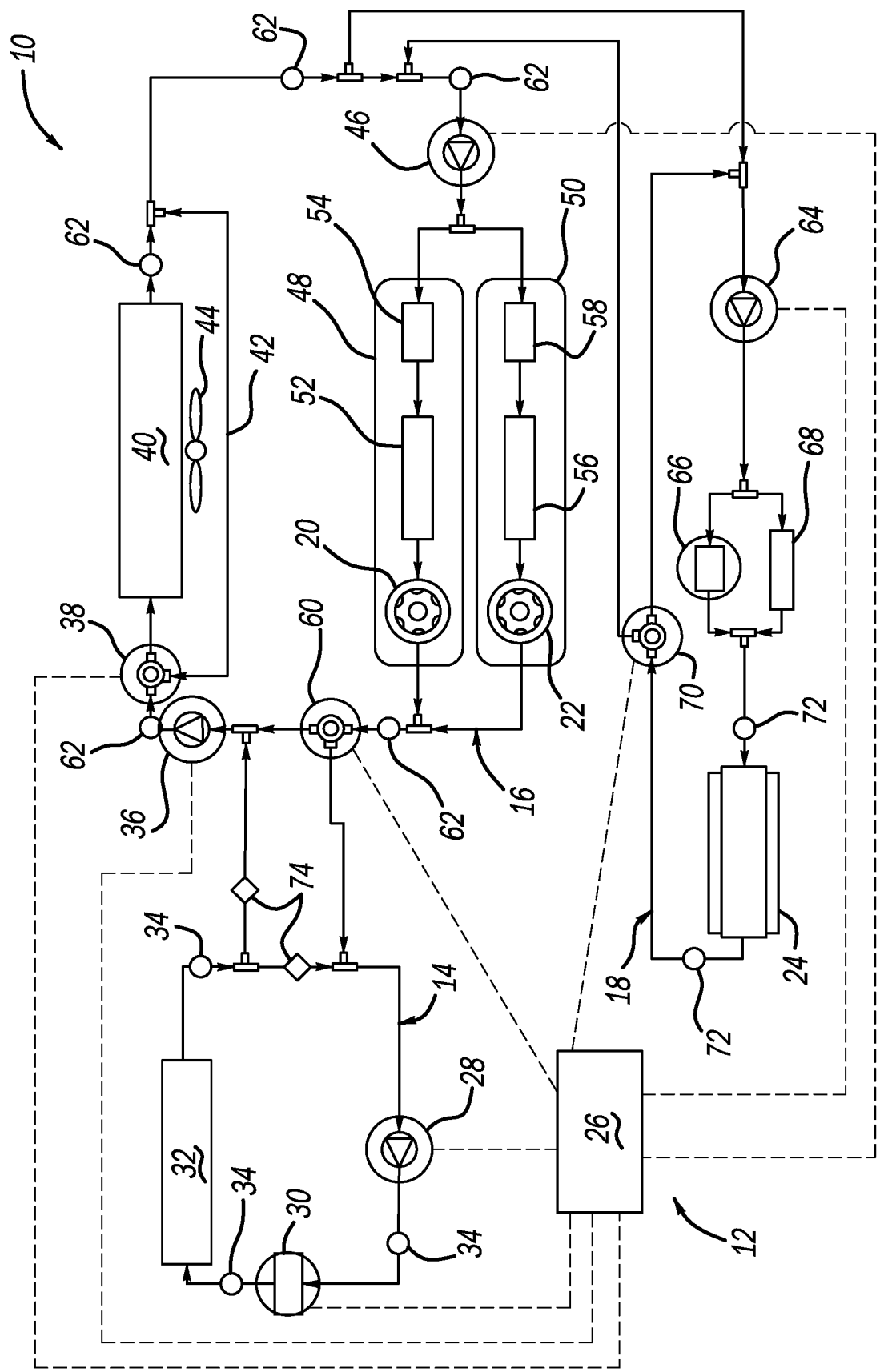
FIG. 1 is a schematic diagram of an example thermal management system (TMS) for a vehicle according to a principle of the present disclosure.

FIG. 1 illustrates an example thermal management system (TMS) 10 for, for example, a battery-powered electric vehicle (BEV) (not shown). While TMS 10 is an example system for a BEV, it should be understood that the teachings of the present disclosure are equally applicable to a hybrid vehicle, if desired. TMS 10 includes a thermal management circuit 12 that includes a plurality of secondary circuits 14, 16, and 18 that are each in fluid communication with each other to collectively define thermal management circuit 12 of TMS 10. In the illustrated example, secondary circuit 14 may be a high-temperature circuit (HTL) for heating a cabin (not shown) of the vehicle, secondary circuit 16 may be a low-temperature circuit (LTL) for cooling first and second electronic drive motors 20 and 22 for actuating the wheels (not shown) of the vehicle, and secondary circuit 18 may be a circuit for cooling and/or heating a battery assembly (hereinafter "battery") 24 of the vehicle. In addition, TMS 10 includes at least one controller 26 for controlling various elements of TMS 10. It should be understood that the TMS 10 illustrated in FIG. 1 is only an example and was selected for ease of illustration, and additional "secondary circuits" for heating/cooling other features of the vehicle may be part of TMS 10, as would be readily acknowledged and appreciated by one skilled in the art. For example, TMS 10 may include a refrigeration circuit or other secondary circuits without limitation, if desired. If TMS 10 includes a refrigeration circuit, the refrigeration circuit may include actuators such as compressors, expansion valves, and the like and as are known to one skilled in the art.

HTL secondary circuit 14 may include a HTL pump 28 for drawing a coolant carried by TMS 10, a HTL electric coolant heater (ECH) 30 for heating the coolant received from HTL pump 28, a HTL heater core 32, and a plurality of HTL temperature sensors 34 that monitor a temperature of the coolant at locations downstream from HTL pump 28, downstream from HTL ECH 30, and downstream from HTL heater core 32, respectively.

LTL secondary circuit 16 may include a first LTL pump 36 for drawing coolant carried by TMS 10. A first LTL three-way valve 38 receives the coolant from the first LTL pump 36 and directs the coolant to either a low temperature radiator 40 (which may be a radiator located at a front of the vehicle) or a by-pass line 42 that bypasses radiator 40. An air moving device such as a fan 44 draws air through radiator 40.

After exiting or bypassing radiator 40, the coolant is drawn by a second LTL pump 46 that directs the coolant to a first electric drive module 48 and a second electric drive module 50. First electric drive module 48 includes first electric motor 20, a first power inverter device 52 that converts a DC voltage provided by battery 24 to an AC voltage, and an auxiliary power module (APM) 54. Second electric drive module 50 includes second electric motor 22, a second power inverter device 56 that converts a DC voltage provided by battery to an AC voltage, and an on-board charging module (OBCM) 58.

Coolant received by each of the first and second electric drive modules 48, 50 may be used to cool the components (e.g., motors 20 and 22, inverters 52 and 56, APM 54, and OBCM 58) of each module 48, 50. LTL secondary circuit 16 may also include a second LTL three-way valve 60 downstream from modules 48, 50 to either direct the coolant to HTL loop 14 or back to first LTL pump 36 to recirculate through LTL secondary circuit 16. A plurality of LTL temperature sensors 62 may also be provided for monitoring a temperature of the coolant at locations downstream from first LTL pump 36, downstream from radiator 40, upstream from second LTL pump 46, and downstream from modules 48, 50 and upstream from second LTL three-way valve 60.

Battery secondary circuit 18 is also configured to receive coolant from either radiator 40 or bypass line 42. Battery secondary circuit 18 may include a battery pump 64 for drawing coolant toward battery secondary circuit 18 and feeding the coolant to either a battery electric coolant heater (ECH) 66 or a battery chiller 68. ECH 66 is configured to warm the coolant to heat battery 24 at times of, for example, cold weather. Similarly, chiller 68 is configured to cool the coolant at times when battery 24 requires cooling (e.g., during use of battery 24). After being either warmed by ECU 66 or cooled by chiller 68, the coolant is fed to battery 24. After heating or cooling battery 24, the coolant travels to a battery three-way valve 70 where the coolant can be directed to either LTL 16 or back to a location upstream of battery pump 64 to be recirculated through battery secondary circuit 18. A plurality of battery circuit temperature sensors 72 may monitor a temperature of the coolant at, for example, locations upstream and downstream of battery 24.

As can be seen from FIG. 1 and the description above, TMS 10 includes a plurality of secondary circuits 14, 16, and 18 that may communicate with each other by way of control of various actuators such as, for example, pumps 28, 36, 46, and 64, and valves 38, 60, and 70. In addition, various check valves 74 may be located throughout TMS 10 to prevent backflow as the coolant is directed throughout TMS 10 and the various secondary circuits 14, 16, and 18. Repositioning of valves 38, 60, and 70 redirects flow throughout TMS 10 and, therefore, can create combinations of sub-domains of coolant flow in TMS 10.

According to the present disclosure, these sub-domains are called "sub-loops." In effect, repositioning of valves 38, 60, and 70 cordons off portions of the TMS 10, which may then be characterized independently from other regions of the flow. Once a sub-loop is characterized, the sub-loop may be used towards the description of any "actuator mode" containing that sub-loop. Again, it should be noted that the phrase "actuator mode" is defined as a collection of states of all the actuators in the TMS 10.

As noted above, the positions of the valves 38, 60, and 70 during use of TMS 10 can create various "sub-loops" that define an isolated fluid domain of the TMS 10. A sub-loop may be defined by, for example, a respective secondary circuit 14, 16, 18, a combination of two secondary circuits (e.g., 14 and 16, 16 and 18, etc.), or a combination of various portions of secondary circuits 14, 16, and 18. For example, first LTL three-way valve 60 is configured to direct flow to HTL 14 during use of HTL 14 to heat the cabin of the vehicle (i.e., in a heating mode), and to low temperature radiator 40 in passive cooling modes. Thus, a combination of HTL 14 and LTL 16 may define one "sub-loop." Similarly, for example, first LTL three-way valve 38 can direct the coolant to the low temperature radiator 40 of the LTL 16 and battery loop 18 to conduct passive cooling of modules 48, 50 and battery 24, or otherwise recirculate the coolant in the LTL 16 when bypassing the radiator 40. Moreover, battery three-way valve 70 provides an interface between the LTL 16 and battery sub-loop 18, either enabling coolant sharing between LTL 16 and battery sub-loop 18 or isolating battery sub-loop 18. In these cases, LTL 16 and battery circuit 18 can define another "sub-loop." In any event, by controlling operation of the valves 38, 60, and 70 (as well as controlling other features such as pumps 28, 26, 46, and 64; fan 44; ECHs 30 and 66, and chiller 68) various "actuator modes" of heating/cooling can be created that optimize heating/cooling afforded by each of the "sub-loops." As noted in the background section of the application, however, it can be very difficult and/or time consuming to develop control algorithms directed to each actuator mode—especially as the number of actuators increases in the TMS 10.

Figure 2:
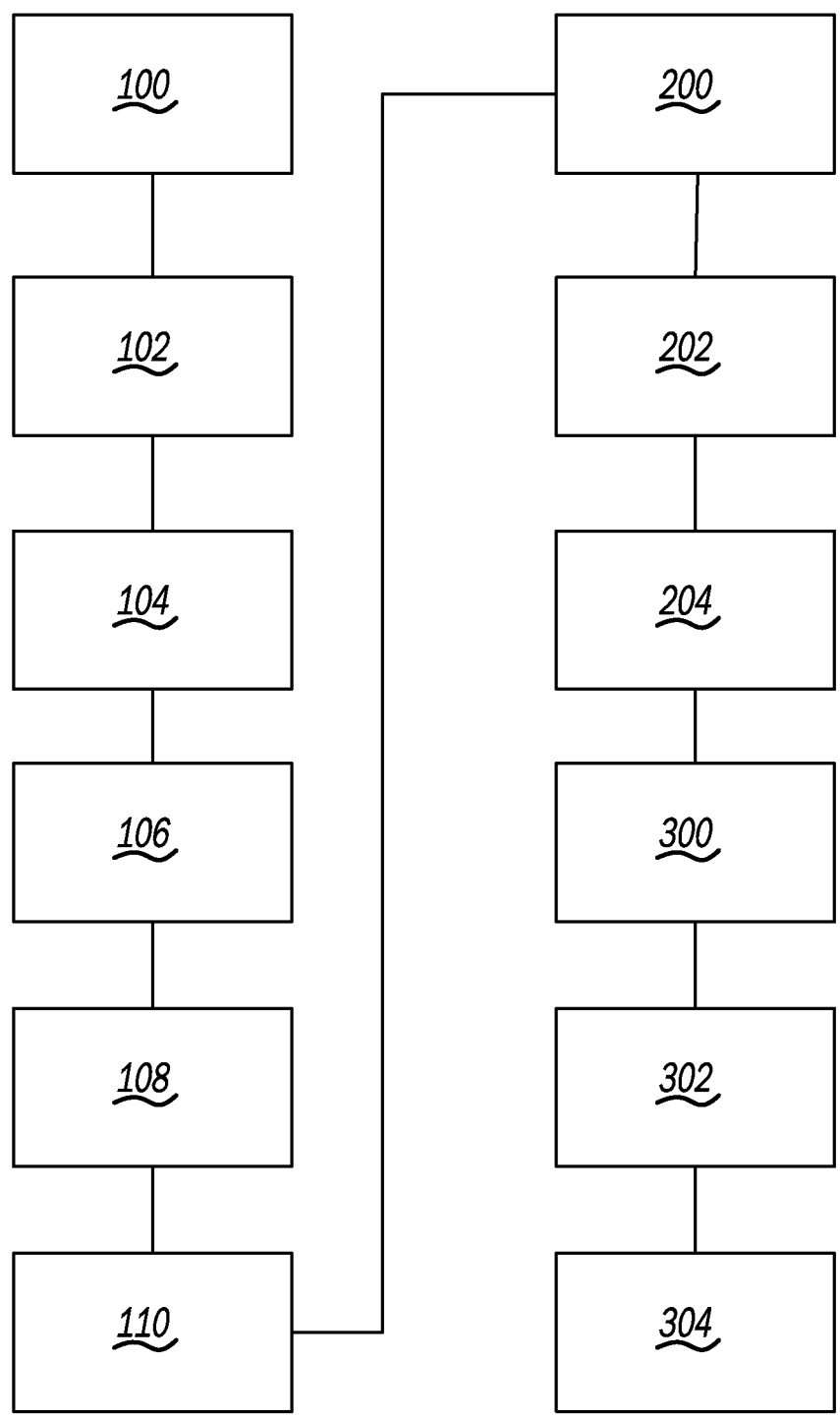
FIG. 2 is a flow chart depicting a method according to a principle of the present disclosure.

In view of the above, and referring to FIG. 2, the present disclosure is directed to a method of developing a control strategy for TMS 10. The method of developing the control strategy for TMS 10 includes (1) a method of decomposing TMS 10 into a plurality of sub-loops (step 100); (2) a method of reconstituting various actuator modes of the TMS 10 (e.g., the valves 38, 60, and 70, pumps 28, 38, 46, and 64, fan 44, etc.) and functions thereof from their constituent sub-loops (step 200); and (3) a method of deploying the reconstituted actuator modes of the TMS 10 in the construction/validation of feedback, feedforward, and/or hybrid control algorithms for thermal management of the various features of TMS 10 (step 300). While the below method is illustrated and described sequentially, it should be understood that in some instances the order of the steps of the method is not significant. For example, an identifier (e.g., name) of a sub-loop can be assigned to the sub-loop before its properties are determined.

The benefits of these methods are that control of TMS 10 can be simplified due to the replacement of isolated mode-by-mode development by significantly sparser sub-loop development followed by modal reconstruction; calibration time can be reduced because validation and experimental/analytical data collection can be done sub-loop by sub-loop rather than mode-by-mode; the software associated with TMS 10 and stored/implemented by controller 26 can be reduced due to the development and deployment of sub-loop libraries; optimized control of TMS 10 can be increased due to the development of sub-loop models for heating/cooling of the various features of TMS 10; and modeling time can be reduced because the sub-loop libraries can be created and stored in a database for future development and/or use.

Control of the valves 38, 60, and 70 can be used to control flow of the coolant through TMS 10 and create sub-loops that may be composed of secondary circuits 14, 16, and 18 or combinations of portions thereof. In effect, operation of valves 38, 60, and 70 can subdivide the flow domain of TMS 10 into various regions (i.e., sub-loops), which can then be characterized independently from other regions (sub-loops) of the TMS 10. Accordingly, after the TMS 10 is decomposed into the sub-loops (step 100), the method includes characterizing the sub-loops in step 102. Once a sub-loop is characterized, the sub-loop can be used to develop various actuator modes of operation to achieve sub-functions (e.g., heating/cooling) of TMS 10 using that particular sub-loop. The number of sub-loops (e.g., 10-20) contained in TMS 10 is much smaller than the number of actuator modes (e.g., 50-200) of TMS 10. Thus, by decomposing TMS 10 into various sub-loops and then determining how the actuators should be used to achieve a particular sub-function of TMS 10, it is much more convenient and expedient to define and characterize operation of the actuators to optimize thermal management of various features (e.g., the cabin of the vehicle, drive modules 48, 50, and battery 24).

After decomposing TMS 10 into various sub-loops (step 100) and characterizing the sub-loops (step 102), the properties associated with each sub-loop may be determined (step 104). Properties of a respective sub-loop that may be determined include, but are not limited to, a flow domain (e.g., volume) of the sub-loop; the flow paths associated with the sub-loop; the sub-functions of the TMS 10 that can be achieved through use of a respective sub-loop (e.g., battery heating/cooling; LTL cooling and LTL recirculation; cabin heating on/off, and combinations thereof (i.e., where the sub-loop is capable of assisting with achieving multiple sub-functions of TMS 10 simultaneously), etc.); the actuators contained with a sub-loop; thermal interfaces to other sub-loops; and performance models and/or simulations of the sub-loop, which can subsequently be used to collect experimental or simulation data sub-loop by sub-loop to calibrate real-time modes of all sub-loops to be used in a control algorithm, or to validate the performance of the control algorithm.

Once the properties of the sub-loop are determined, the sub-loop may be assigned an identifier (e.g., a name or some other type of indicia) for database purposes (step 106). For example, a sub-loop associated with thermal management of a cabin of the vehicle may be called "CABIN CONDITIONING LOOP," a sub-loop associated with thermal management of the modules 48, 50 can be called "LTL CONDITIONING LOOP," and a sub-loop associated with thermal management of the battery 24 can be called "BATTERY CONDITIONING LOOP."

After determining the properties associated with each sub-loop (step 104) and assigning an identifier of the sub-loop for database purposes (step 106), the possible sub-functions of TMS 10 with which a respective sub-loop can assist in achieving is determined (step 108).

For example, in the illustrated embodiment of FIG. 1, the sub-functions of TMS 10 include cabin conditioning, battery conditioning, and LTL conditioning. In addition, there are possible states associated with each sub-function. For the sub-function associated with cabin conditioning, the possible states can include "heating" and "off." For the sub-function associated with thermal management of the battery 24 (i.e., battery conditioning), the possible states can include "heating," "cooling," and "off." For the sub-function associated with thermal management of the drive modules 48 and 50 (i.e., LTL conditioning), the possible states can include "conditioning" (i.e., where coolant merely flows through modules 48 and 50 after bypassing radiator 40) and "cooling."

Moreover, it is important to keep in mind that TMS 10 may be designed such that the sub-functions of TMS 10 (i.e., cabin conditioning, battery conditioning, and LTL conditioning) can be conducted simultaneously through control of the actuators (e.g., valves 38, 60, 70) of TMS 10 (i.e., the functions of the sub-loops can be combined).

After determining the possible sub-functions of TMS 10 with which each sub-loop can assist in achieving (step 108) and the potential states of each sub-function, all of the global thermal functions (GTFs) of TMS 10 are determined in step 110. The GTFs of TMS 10 define the functional intent of TMS 10. The number of feasible GTFs in the illustrated TMS 10 is twelve. In this regard, the number of states associated with the sub-function of cabin conditioning is two, the number of states associated with the sub-function of battery conditioning is three, the number of states associated with the sub-function of LTL conditioning is two, and (2·3·2=12). The twelve GTFs of the example TMS 10 illustrated in FIG. 1 are listed in FIG. 3.

Next, after determining all possible GTFs of the TMS 10, the actuator modes that are capable of satisfying a respective GTF in at least a portion of the operating space are determined and stored in a database (step 200). FIG. 4 lists a plurality of actuator modes of all of the actuators that are part of TMS 10 for one of the GTFs listed in FIG. 3 (i.e., GTF No. 1 that includes "Battery Heating-Cabin Heating-LTL Conditioning"). In the illustrated example, there are twelve actuator modes that are capable achieving GTF No. 1.

In FIG. 4, the binary positions of the HTL ECH 30, battery ECH 66, chiller 68, first LTL three-way valve 38, battery three-way valve 70, second LTL three-way valve 60, battery pump 64, LTL pump 46, and HTL pump 28 are illustrated for each respective "actuator mode" for GTF No. 1. If one of the above-noted actuators is in operation during a respective "actuator mode" for GTF No. 1, operation thereof is defined using a "1" and if one of the above-noted actuators is not being operated during this "actuator mode" for GTF No. 1, non-operation thereof is denoted using a "0." After all the actuator modes for a particular GTF are determined, the actuator modes may then be stored in a memory that may be part of controller 26. The actuator modes for each of the remaining GTFs listed in FIG. 3 may be determined in a similar manner. It should be understood that the positions of the actuators being described as "binary" is only for ease of description. Indeed, one skilled in the art will readily acknowledge and appreciate that TMS 10 can include actuators that function in a non-binary manner (e.g., ternary or greater) without limitation.

Next, after determining all possible actuator modes for a respective GTF in step 200, a method to select a particular actuator mode from the plurality of candidate actuator modes within each GTF, for a given system state and target, is developed (step 202). The method may involve simple rule-based logic (e.g., if the ambient temperature is greater than −10 degrees C., use a heat pump mode to heat the cabin—otherwise, use an electric coolant heater to perform that function), or it may involve a more detailed approach such as solving an optimal control problem, or a combination of the aforementioned approaches. After determining the appropriate method to select a particular actuator mode, the selected method is used to select the desired actuator mode (step 204).

Next, after developing a method to select an actuator mode from the number of candidate actuator modes in step 202, control algorithms are developed off-line for each sub-loop (step 300). Although the fluid contained in a sub-loop is confined to the sub-loop and does not interact with fluid in other sub-loops, thermal interaction can occur between sub-loops (e.g., heat can flow from a coolant sub-loop, across the heat transfer surfaces of a chiller, and into a refrigerant sub-loop (if TMS 10 includes a refrigerant sub-loop)). In these cases, the coupling between interacting sub-loops, although weak, may require that the control algorithm account for the coupling.

The algorithm may perform at least one of feedback control, feedforward control, a combination of feedback/feedforward control, and optimal control of the thermal management circuit. The algorithm determines for a prevailing system state and target(s), the speed of HTL pump 28, first LTL pump 36, second LTL pump 46, and battery pump 64 (if a pump is not being used, the speed can be zero), and the actuator positions of devices such as HTL ECH 30 and battery ECH 66 (heater power), fan 44 (revolutions per minute, RPM), battery chiller 68 (expansion valve position), etc. In addition, as noted above, performance models and/or simulations can be generated for each sub-loop. The collected experimental or simulation data may be used to validate the performance of the control algorithm (step 302). The algorithms for each sub-loop may be designed to support all possible ways to use the sub-loop (i.e., designed for all feasible actuator modes).

Once the control algorithms are developed for TMS 10 and stored in a memory of TMS 10 that may be part of controller 26, controller 26 may execute the control algorithms to control TMS 10. During execution of the control algorithms, controller 26 may receive data from the sensors 34, 62, and 72 as well as other sensors (e.g., pressure sensors, etc.). Based on the signals generated by sensors 34, 62, and 72, at least one of feedback control, feedforward control, a combination of feedback/feedforward control, and optimal control of the thermal management circuit may be conducted (step 304). In this manner, TMS 10 can be efficiently used to provide the necessary heating and/or cooling of each of the components contained in TMS 10. While the control algorithms are described above as being stored on controller 26, it should be understood that the control algorithms may also be stored in a database library for use in other existing thermal management systems or for development of new thermal management systems.

In view of the above-described methods, it is much more efficient and expedient to develop a control strategy for TMS 10. Indeed, by decomposing TMS 10 into various sub-loops and then identifying the actuator modes associated with each GTF and the sub-loops associated with each actuator mode, it is much less time consuming to develop a control algorithm for each actuator mode by assembling the control algorithms of each of its sub-loops.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of developing a control strategy for a thermal management system, comprising:
    decomposing a thermal management circuit defined by a plurality of secondary circuits that are each in fluid communication with each other into a plurality of sub-loops, the fluid communication between each of the secondary circuits and thermal management of the thermal management circuit being controlled by a plurality of actuators;
    determining at least one global thermal function associated with the thermal management circuit;
    after determining the at least one global thermal function associated with the thermal management circuit, determining an actuator mode capable of achieving the at least one global thermal function wherein the actuator mode is a collection of states of each of the plurality of actuators in the thermal management circuit; and
    forming at least one control algorithm for the thermal management circuit based on the actuator mode,
    wherein the control algorithm provides each of optimal control, feedback control, feedforward control, and a combination of feedback/feedforward control of the thermal management circuit.

2. The method of claim 1, wherein the at least one global thermal function includes a combination of sub-functions.

3. The method of claim 1, wherein after the thermal management circuit has been decomposed into the plurality of sub-loops, the method further comprises determining properties of each of the sub-loops.

4. The method of claim 3, wherein the determining properties of each of the sub-loops includes determining at least one selected from the group consisting of:
    a flow domain defined by each of the sub-loops;
    a flow path of each of the sub-loops;
    a number of sub-functions to be performed by each of the sub-loops;
    the actuators contained in the sub-loop; and
    performance models and/or simulations of the sub-loop.

5. The method of claim 4, wherein the determining properties of each of the sub-loops includes determining whether there is a thermal interface between the sub-loops.

6. The method of claim 4, wherein the determining performance models and/or simulations of the sub-loop includes collecting experimental or simulation data sub-loop by sub-loop to calibrate real-time modes of each of the sub-loops that are used in the control algorithm.

7. The method according to claim 4, wherein the determining performance models and/or simulations of the sub-loop includes collecting experimental or simulation data sub-loop by sub-loop to validate performance of the control algorithm.

8. The method according to claim 3, wherein after properties of each of the sub-loops has been determined, the method further comprises assigning an identifier for each sub-loop.

9. The method according to claim 1, wherein the determining an actuator mode capable of achieving the at least one global thermal function includes determining a plurality of actuator modes capable of achieving the respective global thermal function.

10. The method according to claim 9, wherein after determining the plurality of actuator modes capable of achieving the at least one global thermal function, the method further comprises selecting at least one of the actuator modes from the plurality for a desired system state and target.

11. The method of claim 1, wherein the plurality of actuators include valves, pumps, coolant heaters, and coolant chillers.

12. The method of claim 1, wherein the thermal management circuit includes components or sub-systems to be thermally managed including a cabin of a vehicle, an electric drive module, and a battery assembly.

13. The method of claim 1, wherein a respective sub-loop is defined by at least one of the secondary circuits.

14. The method of claim 1, wherein a respective sub-loop is defined by a combination of at least portions of the secondary circuits.

15. A thermal management system developed according to the method of claim 1.

16. The thermal management system according to claim 15, comprising a controller that is configured to store and execute the control algorithm.

17. The thermal management system according to claim 16, further comprising a plurality of sensors in communication with the controller, and based on signals received from the plurality of sensors, the controller is configured to execute at least one of feedback control, feedforward control, and a combination of feedback/feedforward control of the thermal management circuit.

* * * * *